United States Patent
Kaufmann et al.

(10) Patent No.: US 9,880,024 B2
(45) Date of Patent: Jan. 30, 2018

(54) MEASUREMENT DEVICE FOR DETERMINING ANGULAR POSITION

(71) Applicant: Micronas GmbH, Freiburg (DE)

(72) Inventors: Timo Kaufmann, Waldkirch-Suggental (DE); Joerg Franke, Freiburg (DE)

(73) Assignee: TDK-Micronas GmbH, Freiburg (DE)

( * ) Notice: Subject to any disclaimer, the term of this patent is extended or adjusted under 35 U.S.C. 154(b) by 317 days.

(21) Appl. No.: 14/656,780

(22) Filed: Mar. 13, 2015

(65) Prior Publication Data

US 2015/0260547 A1  Sep. 17, 2015

(30) Foreign Application Priority Data

Mar. 13, 2014  (DE) .................... 10 2014 003 408

(51) Int. Cl.
*G01B 7/30* (2006.01)
*G01D 5/14* (2006.01)

(52) U.S. Cl.
CPC ............... *G01D 5/14* (2013.01); *G01D 5/145* (2013.01)

(58) Field of Classification Search
CPC ........................................................ G01P 3/42
See application file for complete search history.

(56) References Cited

U.S. PATENT DOCUMENTS

| | | | |
|---|---|---|---|
| 5,055,781 A | 10/1991 | Sakakibara et al. | |
| 6,288,533 B1 | 9/2001 | Haeberli et al. | |
| 6,489,761 B1 * | 12/2002 | Schroeder | G01D 5/145 |
| | | | 123/617 |
| 6,586,929 B1 | 7/2003 | Luetzow | |
| 6,640,652 B2 | 11/2003 | Kikuchi et al. | |
| 6,731,109 B2 | 5/2004 | Johnson et al. | |
| 7,049,808 B2 * | 5/2006 | Martinez | G01D 5/145 |
| | | | 324/207.25 |
| 7,521,922 B2 | 4/2009 | Stuve | |
| 7,592,803 B1 * | 9/2009 | Guo | B82Y 25/00 |
| | | | 324/207.21 |
| 8,242,776 B2 | 8/2012 | Mather et al. | |
| 8,269,486 B2 | 9/2012 | Hammerschmidt et al. | |
| 8,680,847 B2 | 3/2014 | Franke et al. | |

(Continued)

FOREIGN PATENT DOCUMENTS

DE  698 16 755 T2  6/2004
WO  WO 2010/060607 A2  6/2010

Primary Examiner — Tung X Nguyen
Assistant Examiner — Dominic Hawkins
(74) Attorney, Agent, or Firm — Muncy, Geissler, Olds & Lowe, P.C.

(57) ABSTRACT

A measurement device for determining an angular position, having a magnet device and a sensor device that are rotatable relative to one another. The magnet device has a first north pole face of a first magnetic north pole and a first south pole face of a first magnetic south pole. The magnet device has a second north pole face of a second magnetic north pole and a second south pole face of a second magnetic south pole. The sensor device is located in a region between the first north pole face and the first south pole face and between the second north pole face and the second south pole face. The sensor device has a first magnetic field sensor and a second magnetic field sensor. The first magnetic field sensor and the second magnetic field sensor are spaced apart from one another for ascertaining a magnetic field difference.

12 Claims, 3 Drawing Sheets

(56) References Cited

U.S. PATENT DOCUMENTS

| | | | |
|---|---|---|---|
| 2002/0118010 A1* | 8/2002 | Pointer | G01D 5/145 |
| | | | 324/207.2 |
| 2004/0032253 A1* | 2/2004 | Suzuki | G01D 5/145 |
| | | | 324/207.24 |
| 2004/0070390 A1* | 4/2004 | Lamb | G01D 5/145 |
| | | | 324/207.21 |
| 2006/0089784 A1* | 4/2006 | Spicer | F02D 41/009 |
| | | | 701/115 |
| 2010/0050731 A1* | 3/2010 | Granig | G01D 5/145 |
| | | | 73/1.11 |

* cited by examiner

MEASUREMENT DEVICE FOR DETERMINING ANGULAR POSITION

This nonprovisional application claims priority under 35 U.S.C. §119(a) to German Patent Application No. 10 2014 003 408.9, which was filed in Germany on Mar. 13, 2014, and which is herein incorporated by reference.

BACKGROUND OF THE INVENTION

Field of the Invention

The present invention relates to a measurement device for determining an angular position.

Description of the Background Art

Known from WO 2010/060607 A2, which corresponds to U.S. Pat. No. 8,680,847, which is incorporated herein by reference, is an IC package with a semiconductor chip with an integrated circuit and an integrated magnetic sensor. Spaced apart from the package of the semiconductor chip is a permanent magnet whose magnetic flux penetrates the sensor. If an object to be measured approaches the head end of the semiconductor chip, the magnetic flux density through the sensor changes.

Known from DE 698 16 755 T2, which corresponds to U.S. Pat. No. 6,288,533, is a magnetic rotary encoder. A method and a device serve to ascertain the rotary position of a rotor with the aid of a magnetic field source attached to the rotor, a so-called transmitter, and a stationary sensor. The sensor in this design measure the magnetic field of the magnetic field source. The magnetic field source here is arranged such that the magnetic field has no rotational symmetry relative to an axis of rotation of the rotor. The method is used to ascertain a rotary position. The mechanical angle (rotary position of the rotor) is ascertained by the means that at least one ratio of two differential signals, each from one sensor pair, is calculated, and the calculated ratio is compared to a predefined function of this ratio of the angle of rotation.

SUMMARY OF THE INVENTION

It is therefore an object of the present invention to provide an improved measurement device to the greatest degree possible.

Accordingly, in an embodiment, a measurement device for determining an angular position is provided that has a magnet device and a sensor device.

The magnet device and the sensor device are rotatable relative to one another. For example, the sensor device is positioned in a rotationally fixed manner and the magnet device is supported in a rotatable manner.

The magnet device has a first north pole face of a first magnetic north pole and a first south pole face of a first magnetic south pole.

The first north pole face and the first south pole face are perpendicular to a spatial direction.

The magnet device has a second north pole face of a second magnetic north pole and a second south pole face of a second magnetic south pole.

The second north pole face and the second south pole face are perpendicular to the spatial direction.

A first magnetic field between the first north pole face and the first south pole face is oriented opposite to a second magnetic field between the second north pole face and the second south pole face.

The sensor device is located in a region between the first north pole face and the first south pole face and between the second north pole face and the second south pole face.

The sensor device has a first magnetic field sensor that is sensitive in the spatial direction.

The sensor device has a second magnetic field sensor that is sensitive in the spatial direction.

The first magnetic field sensor and the second magnetic field sensor are spaced apart from one another for ascertaining a magnetic field difference.

Several advantages are achieved through a concrete implementation such as is depicted by way of example in an exemplary embodiment. As a result of an appropriate choice of the spacing of the pole faces, the magnetic field component in the spatial direction is homogeneous over a large region. The magnetic field sensors are operated differentially to evaluate the angular position. Homogeneous interfering magnetic fields are significantly reduced by the differential operation of the magnetic field sensors. The homogeneous region of the magnetic field lines spanned by the pole faces makes it possible to provide a measurement device that is insensitive to positioning errors.

The measurement device has a magnet device and a sensor device.

The magnet device and the sensor device are rotatable relative to one another. For example, the sensor device is positioned in a rotationally fixed manner and the magnet device is supported in a rotatable manner.

The magnet device has a first north pole face of a first magnetic north pole and a first south pole face of a first magnetic south pole.

The first north pole face and the first south pole face are perpendicular to a spatial direction.

The magnet device has a second north pole face of a second magnetic north pole and a second south pole face of a second magnetic south pole.

The second north pole face and the second south pole face are perpendicular to the spatial direction.

A first magnetic field between the first north pole face and the first south pole face is oriented opposite to a second magnetic field between the second north pole face and the second south pole face.

The sensor device is located in a region between the first north pole face and the first south pole face and between the second north pole face and the second south pole face.

The sensor device has a first magnetic field sensor that is sensitive perpendicular to the spatial direction.

The sensor device has a second magnetic field sensor that is sensitive perpendicular to the spatial direction.

The first magnetic field sensor and the second magnetic field sensor are spaced apart from one another in the spatial direction for ascertaining a magnetic field difference.

The improvements described below relate to both above-described aspects of the invention.

According to an embodiment, a first air gap is formed between the sensor device and a combined area comprising the first north pole face and the second south pole face. According to an embodiment, a second air gap is formed between the sensor device and a combined area comprising the second north pole face and the first south pole face. Preferably, the first north pole face and/or the first south pole face and/or the second north pole face and/or the second south pole face are planar in design.

According to an embodiment, the first north pole face and the second south pole face are associated with a first magnet. The second north pole face and the first south pole face are advantageously associated with a second magnet.

According to another embodiment, the first north pole face and the first south pole face are associated with a first magnet. The second north pole face and the second south pole face are advantageously associated with a second magnet.

According to another embodiment, the first north pole face is associated with a first magnet. The first south pole face is advantageously associated with a second magnet. The second north pole face is advantageously associated with a third magnet. The second south pole face is advantageously associated with a fourth magnet.

According to another embodiment, the first north pole face and the second south pole face lie in a plane. According to another embodiment, the second north pole face and the first south pole face lie in a plane. For example, the first north pole face is adjacent to the second south pole face. For example, the second north pole face is adjacent to the first south pole face.

According to another embodiment, the sensor device has a third magnetic field sensor sensitive in the spatial direction. The sensor device advantageously has a fourth magnetic field sensor sensitive in the spatial direction. The third magnetic field sensor and the fourth magnetic field sensor are advantageously spaced apart from one another for ascertaining a magnetic field difference. The third magnetic field sensor and the fourth magnetic field sensor are advantageously spaced apart from the first magnetic field sensor and the second magnetic field sensor.

According to another embodiment, the first magnetic field sensor and the second magnetic field sensor and/or the third magnetic field sensor and the fourth magnetic field sensor are monolithically integrated into a semiconductor chip. The magnetic field sensors are preferably designed as Hall sensors. In particular, it is advantageous for each of the Hall sensors to be designed as pixel cells. In this context, the term pixel cell can be understood to mean a multidimensional Hall sensor, wherein the center points of the individual Hall sensors can coincide within a pixel cell. In another improvement, the Hall sensors can be designed as Hall plates.

The improvement variants described above are especially advantageous both individually and in combination. All improvement variants can be combined with one another. Some possible combinations are explained in the description of the exemplary embodiments from the figures. However, these possibilities of combinations of the improvement variants shown there are not exhaustive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
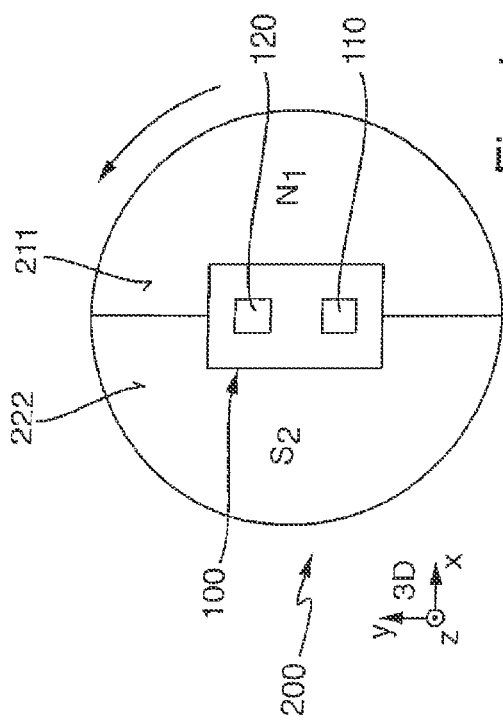
FIGS. 1a and 1b illustrate schematic views of an embodiment of a measurement device.
Figure 1B:
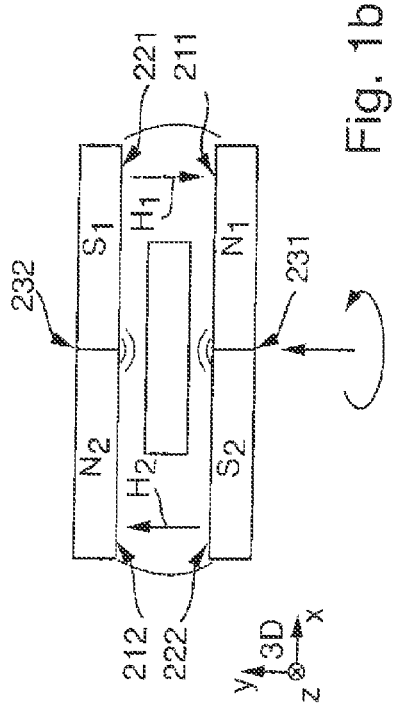

FIGS. 1a and 1b schematically show a measurement device for determining an angular position, having a magnet device 200 and a sensor device 100. The magnet device 100 of the embodiment from FIG. 1b has a first magnet 231 and a second magnet 232. In the embodiment from FIG. 1b, the magnets 231, 232 are rotationally fixed relative to one another, but are supported so as to be rotatable relative to the sensor device 200.

The magnets 231, 232 of the magnet device 200 produce a first north pole face 211 of a first magnetic north pole $N_1$, and a first south pole face 221 of a first magnetic south pole $S_1$, and a second north pole face 212 of a second magnetic north pole $N_2$, and a second south pole face 222 of a second magnetic south pole $S_2$. One example of a circular shape for the pole faces 211, 222 is shown schematically in FIG. 1a. In the embodiment from FIG. 1a the circle defined by the pole faces 211, 222 is centered about an axis of rotation and is supported by a shaft, for example.

The first north pole face 211 is located opposite the first south pole face 221. The first north pole face 211 and the first south pole face 221 in this design are perpendicular to a spatial direction z. Thus, the spatial direction z is parallel to the surface normals of the pole faces 211, 221. The spatial directions x, y orthogonal to the spatial direction are correspondingly orthogonal to the surface normals of the pole faces 211, 221. The second north pole face 212 is located opposite the second south pole face 222. The second north pole face 212 and the second south pole face 222 are likewise perpendicular to the spatial direction z.

A first magnetic field $H_1$ between the first north pole face 211 and the first south pole face 221 is oriented opposite to a second magnetic field $H_2$ between the second north pole face 221 and the second south pole face 222. This is the case at least in a region inside the pole faces 211, 212, 221, 222. With a suitable spacing between the opposing north and south poles $N_1$, $N_2$, $S_1$, $S_2$, the magnetic field between the pole faces 211, 212, 221, 222 is largely homogeneous.

The sensor device 100 is located in a region between the first north pole face 211 and the first south pole face 221 and between the second north pole face 212 and the second south pole face 222 in a sandwich-like structure. The sandwich structure, in the present case implemented as a magnet/sensor device/magnet arrangement, is shown schematically in FIG. 1b. Also shown schematically are the magnetic field lines formed between the pole faces 211, 212, 221, 222, which exhibit a largely homogeneous magnetic field.

The goal of the present sandwich arrangement is to significantly reduce, or even eliminate, stray magnetic fields, and at the same time to preserve the pure useful magnetic signal of a magnet. This is achieved by means of the arrangement explained above. In this arrangement, the sensor device 100 has a first magnetic field sensor 110 that is sensitive in the spatial direction z, and a second magnetic field sensor 120 that is sensitive in the spatial direction z. The first magnetic field sensor 110 and the second magnetic field sensor 120 are spaced apart from one another in order to ascertain a magnetic field difference. Accordingly, the two magnetic field sensors 110, 120 are operated differentially. It is necessary to keep in mind here that the useful signal has a gradient over the differentially operated magnetic field sensors 110, 120. This condition limits the possible combinations of magnets 201, 202 and the magnetic field sensors 110, 120 employed. Possible concepts for a stray field-suppressing rotation angle sensor device are shown schematically in FIGS. 1a to 6b.

Figure 2A:
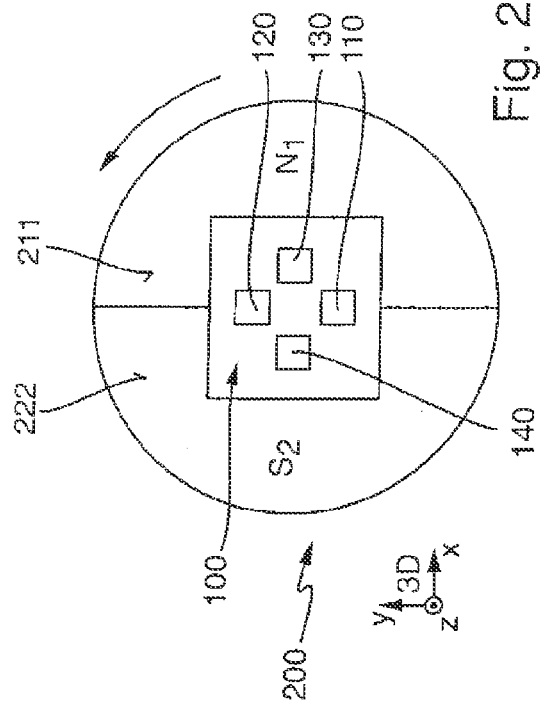
FIGS. 2a and 2b illustrate schematic views of an embodiment of a measurement device.
Figure 2B:
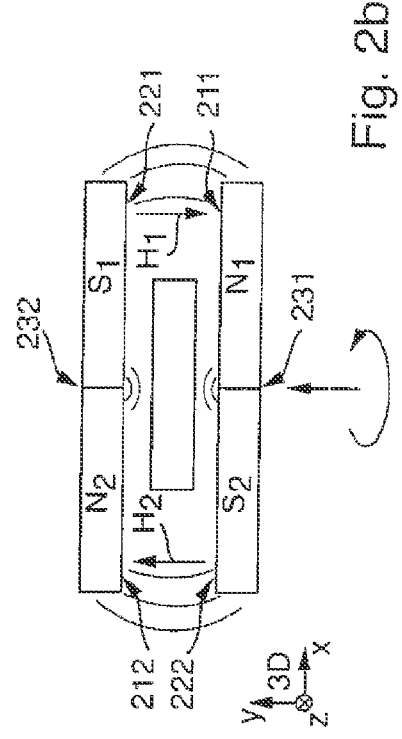

Another embodiment is shown schematically in FIGS. 2a and 2b. Unlike the embodiment from FIGS. 1a and 1b, a sensor device with four magnetic field sensors 110, 120, 130, 140 is provided in the embodiment from FIGS. 2a and 2b. The third magnetic field sensor 130 of the sensor device 100 in this embodiment is likewise sensitive in the spatial direction z. The fourth magnetic field sensor 140 of the sensor device 100 is likewise sensitive in the spatial direction z.

The third magnetic field sensor 130 and the fourth magnetic field sensor 140 are spaced apart from one another in order to ascertain a magnetic field difference. Accordingly, pairs of magnetic field sensors 110, 120 and 130, 140 are operated differentially. The third magnetic field sensor 130 and the fourth magnetic field sensor 140 are spaced apart from the first magnetic field sensor 110 and the second magnetic field sensor 120. The pair including the third magnetic field sensor 130 and the fourth magnetic field sensor 140 is offset by 90° in the direction of rotation relative to the pair including the first magnetic field sensor 110 and the second magnetic field sensor 120 in the embodiment from FIG. 2a. A higher resolution of the angle of rotation that is to be determined is achieved through the use of four magnetic field sensors 110, 120, 130, 140.

Figure 3:
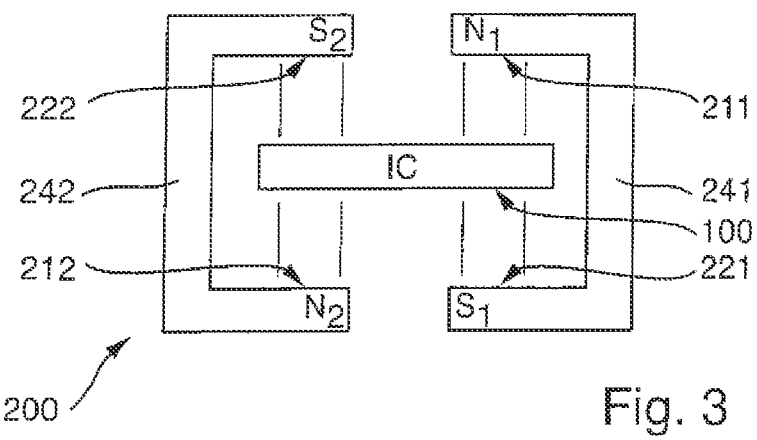
FIG. 3 illustrates a schematic view of an embodiment of a measurement device.

Another embodiment is shown schematically in FIG. 3. In the embodiment from FIG. 3, two U-shaped magnets are provided. The first north pole face 211 and the first south pole face 221 are associated with a first magnet 241. The second north pole face 212 and the second south pole face 222 are associated with a second magnet 242. In the embodiment from FIG. 3, the magnets 241, 242 are arranged to be rotationally fixed and the sensor device 100 is rotatably supported, for example by means of a shaft (not shown). FIG. 3 is a purely schematic representation here. Preferably, the spacings between the pole faces 211, 221 and 212, 222 are made as small as possible.

Figure 4:
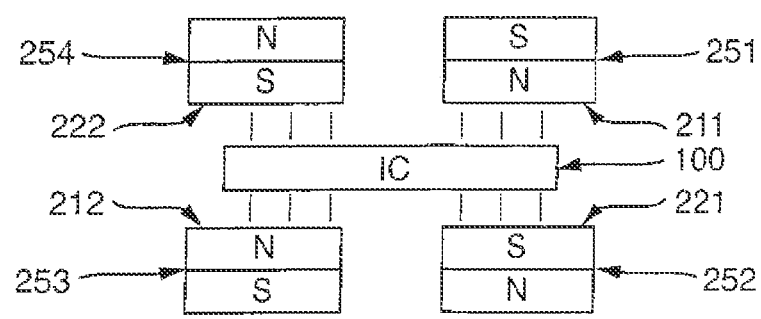
FIG. 4 illustrates a schematic view of an embodiment of a measurement device.
Figure 5A:
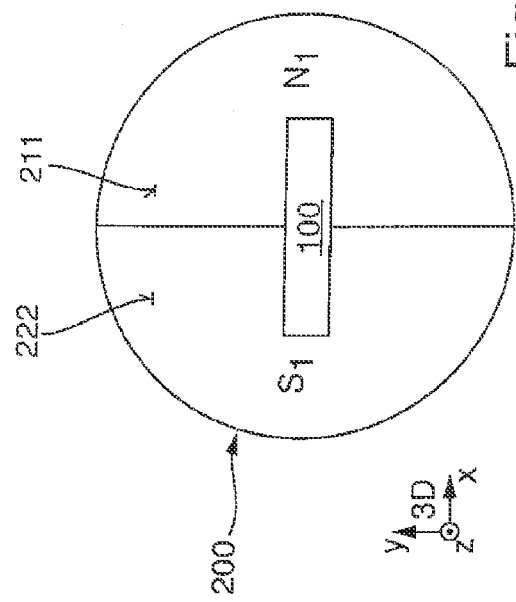
FIGS. 5a and 5b illustrate schematic views of an embodiment of a measurement device.
Figure 5B:
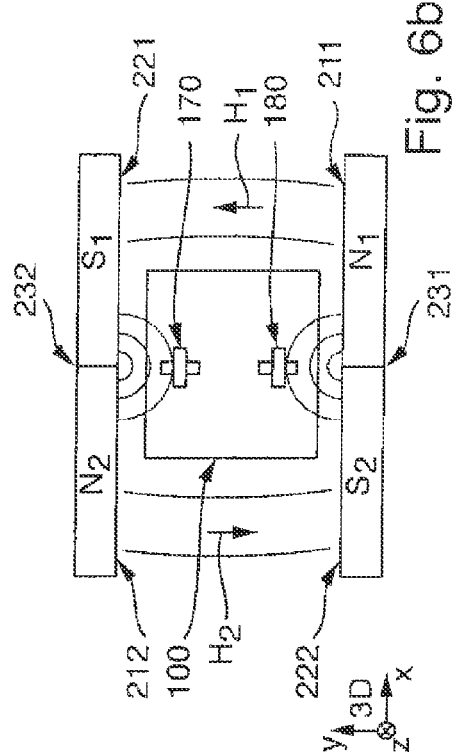
Figure 6A:
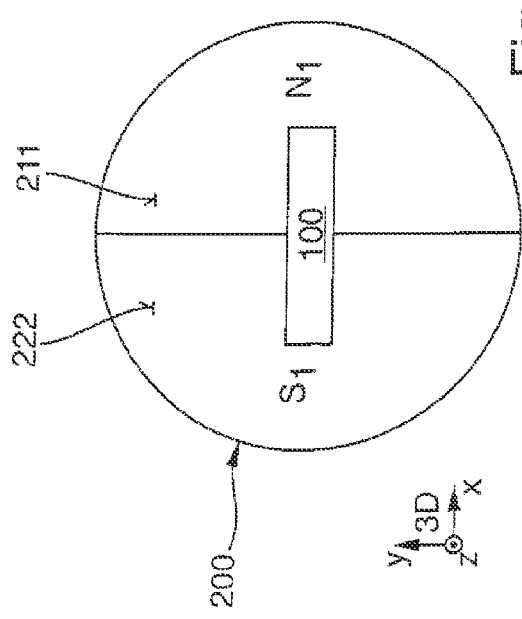
FIGS. 6a and 6b illustrate schematic views of an embodiment of a measurement device.
Figure 6B:
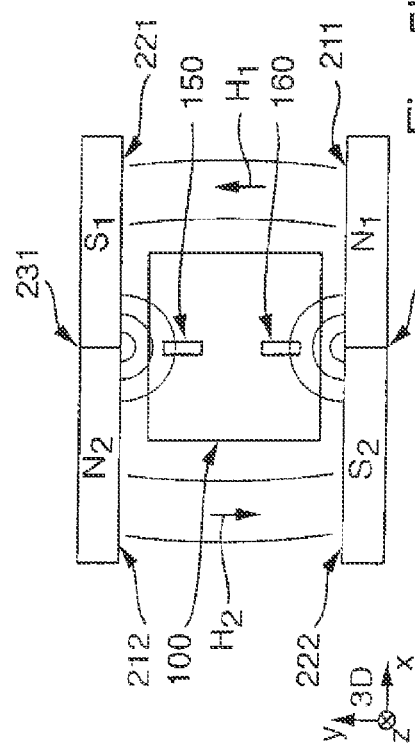

Another embodiment is shown schematically in FIG. 4. In the embodiment from FIG. 4, four magnets 251, 252, 253, 254 are arranged to form the pole faces 211, 221, 212, 222. In this design, the first north pole face 211 is associated with a first magnet 251. The first south pole face 221 is associated with a second magnet 252. The second north pole face 212 is associated with a third magnet 253. The second south pole face 222 is associated with a fourth magnet 254.

Other embodiments are shown schematically in FIGS. 5a and 5b, and 6a and 6b. In the embodiments from FIG. 5b/6b as well, a sensor device 100 is located in a region between a first north pole face 211 and a first south pole face 221 and between a second north pole face 212 and a second south pole face 222. The sensor device 100 and magnet device 200 are arranged so as to be rotatable about an axis in the spatial direction z relative to one another.

The sensor device 100 has a first magnetic field sensor 150, 170 that is sensitive perpendicular to the spatial direction z. In the embodiment from FIGS. 5a and 5b, the first magnetic field sensor 150 is sensitive in the spatial direction x. In the embodiment from FIGS. 6a and 6b, the first magnetic field sensor 170 is sensitive in the spatial direction y.

The sensor device 100 has a second magnetic field sensor 160, 180 that is sensitive perpendicular to the spatial direction z. In the embodiment from FIGS. 5a and 5b, the second magnetic field sensor 160 is sensitive in the spatial direction x. In the embodiment from FIGS. 6a and 6b, the second magnetic field sensor 180 is sensitive in the spatial direction y.

In both embodiments from FIGS. 5a to 6b, the first magnetic field sensor 150, 170 and the second magnetic field sensor 160, 180 are spaced apart from one another in the spatial direction z in order ascertain a magnetic field difference.

The invention is not limited to the variant embodiments shown in FIGS. 1a to 6b. For example, it is possible to provide a number of magnetic poles greater than four. It is likewise possible for individual magnets to not be magnetized along a straight line, but instead with a curvature in order to further increase the homogeneous region of the magnetic field between the pole faces 211, 221, 212, 222. The functionality of the measurement device from FIG. 1b can be used for a mechanical actuating system or drive system, for example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measurement device for determining an angular position, the measurement device comprising:
   a magnet device; and
   a sensor device, the magnet device and the sensor device being arranged rotatable relative to one another,
   wherein the magnet device has a first north pole face of a first magnetic north pole and a first south pole face of a first magnetic south pole, the first north pole face and the first south pole face being substantially perpendicular to a spatial direction,
   wherein the magnet device has a second north pole face of a second magnetic north pole and a second south pole face of a second magnetic south pole, the second north pole face and the second south pole face being substantially perpendicular to the spatial direction,
   wherein a first magnetic field between the first north pole face and the first south pole face is oriented opposite to a second magnetic field between the second north pole face and the second south pole face,
   wherein the sensor device is located in a region between the first north pole face and the first south pole face and between the second north pole face and the second south pole face,
   wherein the sensor device has a first magnetic field sensor that is sensitive in the spatial direction,
   wherein the sensor device has a second magnetic field sensor that is sensitive in the spatial direction,
   wherein the first magnetic field sensor and the second magnetic field sensor are spaced apart from one another for ascertaining a magnetic field difference,
   wherein the first magnetic field between the first north pole face and the first south pole face is oriented in a first field direction opposite to a second field direction of the second magnetic field between the second north pole face and the second south pole face, wherein the first field direction and the second field direction are substantially parallel, and wherein the first field direction and the second field direction are substantially parallel to the spatial direction.

2. The measurement device according to claim 1, wherein the first north pole face and the second south pole face are associated with a first magnet, and wherein the second north pole face and the first south pole face are associated with a second magnet.

3. The measurement device according to claim 1, wherein the first north pole face and the first south pole face are associated with a first magnet, and wherein the second north pole face and the second south pole face are associated with a second magnet.

4. The measurement according to claim 1, wherein the first north pole face is associated with a first magnet, wherein the first south pole face is associated with a second magnet, wherein the second north pole face is associated with a third magnet, and wherein the second south pole face is associated with a fourth magnet.

5. The measurement device according to claim 1, wherein the first north pole face and the second south pole face lie in a plane, or wherein the second north pole face and the first south pole face lie in a plane.

6. The measurement device according to claim 1, wherein the sensor device has a third magnetic field sensor sensitive in the spatial direction, wherein the sensor device has a fourth magnetic field sensor sensitive in the spatial direction, wherein the third magnetic field sensor and the fourth magnetic field sensor are spaced apart from one another for ascertaining a magnetic field difference, and wherein the third magnetic field sensor and the fourth magnetic field sensor are spaced apart from the first magnetic field sensor and the second magnetic field sensor.

7. The measurement device according to claim 6, wherein the first magnetic field sensor and the second magnetic field sensor and/or the third magnetic field sensor and the fourth magnetic field sensor are integrated into a semiconductor chip.

8. The measurement device according to claim 1, wherein the first north pole face of the first magnetic north pole and the second south pole face of the second magnetic south pole are on a first magnet having a first extension direction, wherein the second north pole face of the second magnetic north pole and the first south pole face of the first magnetic south pole are on a second magnet having a second extension direction substantially parallel to the first extension direction, and wherein the first magnet and the second magnet are spaced apart forming a gap which accommodates the sensor device.

9. The measurement device according to claim 8, wherein the first magnetic field and the second magnetic field flow across the gap and through the sensor device.

10. The measurement device according to claim 8, wherein the first magnetic field sensor and the second magnetic field sensor are spaced apart substantially parallel to the first extension direction and the second extension direction.

11. The measurement device according to claim 1, wherein the first magnetic field sensor and the second magnetic field sensor are spaced apart substantially parallel to the first north pole face, the second north pole face, the first south pole face and the second south pole face.

12. A measurement device for determining an angular position, the measurement device comprising:

a magnet device; and a sensor device, the magnet device and the sensor device being arranged rotatable relative to one another, wherein the magnet device has a first north pole face of a first magnetic north pole and a first south pole face of a first magnetic south pole, the first north pole face and the first south pole face being substantially perpendicular to a spatial direction, wherein the magnet device has a second north pole face of a second magnetic north pole and a second south pole face of a second magnetic south pole, the second north pole face and the second south pole face being substantially perpendicular to the spatial direction, wherein a first magnetic field between the first north pole face and the first south pole face is oriented opposite to a second magnetic field between the second north pole face and the second south pole face, wherein the sensor device is located in a region between the first north pole face and the first south pole face and between the second north pole face and the second south pole face, wherein the sensor device has a first magnetic field sensor that is sensitive perpendicular to the spatial direction, wherein the sensor device has a second magnetic field sensor that is sensitive perpendicular to the spatial direction, wherein the first magnetic field sensor and the second magnetic field sensor are spaced apart from one another in the spatial direction for ascertaining a magnetic field difference, wherein the first magnetic field between the first north pole face and the first south pole face is oriented in a first field direction opposite to a second field direction of the second magnetic field between the second north pole face and the second south pole face, wherein the first field direction and the second field direction are substantially parallel, and wherein the first field direction and the second field direction are substantially parallel to the spatial direction.

* * * * *